United States Patent
Ueda et al.

(10) Patent No.: US 6,527,978 B2
(45) Date of Patent: Mar. 4, 2003

(54) PHOSPHOR FOR VACUUM ULTRAVIOLET RAY-EXCITING LIGHT-EMITTING ELEMENT

(75) Inventors: Kyota Ueda, Tsukuba (JP); Tadashi Endo, Iwanuma (JP); Keiji Ono, Tsukuba (JP); Susumu Miyazaki, Ibaraki (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

(21) Appl. No.: 09/791,605

(22) Filed: Feb. 26, 2001

(65) Prior Publication Data

US 2001/0030314 A1 Oct. 18, 2001

(30) Foreign Application Priority Data

Feb. 29, 2000 (JP) ........................................ 2000-053522

(51) Int. Cl.$^7$ ......................... C09K 11/64; C09K 11/78; H01J 11/02; H01J 15/02
(52) U.S. Cl. ............................... 252/301.4 R; 313/467; 313/482; 313/486; 313/495
(58) Field of Search .................. 252/301.4 R; 313/467, 313/486, 495, 482

(56) References Cited

U.S. PATENT DOCUMENTS

| | | | | |
|---|---|---|---|---|
| 4,216,408 A | * | 8/1980 | Verstegen et al. | 252/301.4 R |
| 5,932,968 A | * | 8/1999 | Ghosh et al. | 313/582 |
| 6,187,225 B1 | * | 2/2001 | Rao | 252/301.4 R |

FOREIGN PATENT DOCUMENTS

| | | | |
|---|---|---|---|
| EP | 0 697 453 A1 | | 2/1996 |
| GB | 1190520 | * | 5/1970 |

OTHER PUBLICATIONS

English Translation of Taiwan Patent Office Reasons for Rejection Aug. 12, 2002.

* cited by examiner

Primary Examiner—C. Melissa Koslow
(74) Attorney, Agent, or Firm—Sughrue Mion, PLLC

(57) ABSTRACT

A phosphor for a vacuum ultraviolet ray-exciting light-emitting element, comprising Eu as an activator, and aluminates having a magnetoplumbite structure.

2 Claims, No Drawings

PHOSPHOR FOR VACUUM ULTRAVIOLET RAY-EXCITING LIGHT-EMITTING ELEMENT

BACKGROUND OF THE INVENTION

1. Field of the Invention

The present invention relates to a phosphor suitable for a vacuum ultraviolet ray-exciting light-emitting element such as plasma display panel (hereinafter, abbreviated as PDP), rare gas lamp and the like, and a vacuum ultraviolet ray-exciting light-emitting element using this phosphor.

2. Description of Related Art

Recently, there is increasing development on vacuum ultraviolet ray-exciting light-emitting elements having a mechanism in which a phosphor is excited to emit light by vacuum ultraviolet ray which is radiated by rare gas discharge. Typical examples thereof include the development of PDP. Though cathode ray tubes (CRT) and color liquid crystal displays have difficulty in increasing the size of a screen, PDP is a flat panel display enabling this size increase and expected to be used for displays in public space and large screen televisions. PDP is a display constituted by placing a lot of minute discharge spaces (hereinafter, sometimes referred to as "display cell") in the form of a matrix. In each display cell, a discharge electrode is provided, and on the inner wall of each display cell, a phosphor is applied. In the space of each display cell, a rare gas such as He—Xe, Ne—Xe, Ar and the like is sealed, and by applying voltage on a discharge electrode, electric discharge occurs in the rare gas and vacuum ultraviolet ray is discharged. By this vacuum ultraviolet ray, a phosphor is excited and visible light is emitted. An image is displayed by assigning the position of an emitting display cell. By using phosphors which emit lights of three primary colors of light, blue, green and red, respectively, full color display can be effected.

As a vacuum ultraviolet ray-exciting light-emitting element other than PDP, a rare gas lamp is exemplified. The rare gas lamp is a lamp emitting light by a mechanism in which vacuum ultraviolet ray is generated by discharge in a rare gas and the vacuum ultraviolet ray is converted to visual light by a phosphor. Since a rare gas lamp uses no mercury, it is noticed from the standpoint of environmental problems.

A phosphor which is excited by vacuum ultraviolet ray radiated by discharge in a rare gas has already been suggested, and as a blue phosphor, $BaMgAl_{10}O_{17}$:Eu is exemplified, as a green phosphor, $Zn_2SiO_4$:Mn is exemplified, and as a red phosphor, $(Y,Gd)BO_3$:Eu is exemplified. However, for full color PDP, a phosphor excellent in the life property of brilliance is desired. Particularly in a blue light emitting phosphor, a phosphor excellent in the life property of brilliance is intensively desired.

An object of the present invention is to provide a phosphor excellent in the life property of brilliance, used for vacuum ultraviolet ray-exciting light-emitting elements such as PDP and the like, and a vacuum ultraviolet ray-exciting light-emitting element using this phosphor.

The present inventors have intensively studied, under such conditions, for solving the above-mentioned problems, and resultantly found that among phosphors of aluminates containing Eu as an activator, a compound having a magnetoplumbite structure is useful as a phosphor for a vacuum ultraviolet ray-exciting light-emitting element, particularly, as a blue phosphor, leading to completion of the present invention.

SUMMARY OF THE INVENTION

Namely, the present invention provides the following [1]–[6].

[1] A phosphor for a vacuum ultraviolet ray-exciting light-emitting element, comprising Eu as an activator, and aluminates having a magnetoplumbite structure.

[2] The phosphor for a vacuum ultraviolet ray-exciting light-emitting element according to [1], wherein the aluminates contain a compound of the composition formula $M_{1-a}Eu_aAl_{12}O_{19}$ wherein M represents one or more elements selected from the group consisting of Ca, Sr and Ba, and the formula satisfies $0.003 \leq a \leq 0.5$.

[3] The phosphor for a vacuum ultraviolet ray-exciting light-emitting element according to [1], wherein the aluminates contain a compound of the composition formula $Ba_{1-a}Eu_aMgAl_6O_{27}$ wherein the formula satisfies $0.003 \leq a \leq 0.5$.

[4] The phosphor for a vacuum ultraviolet ray-exciting light-emitting element according to [1], wherein the aluminates contain a compound of the composition formula $Ba_{1-a}Eu_aMgAl_6O_{11}$ wherein the formula satisfies $0.003 \leq a \leq 0.5$.

[5] The phosphor for a vacuum ultraviolet ray-exciting light-emitting element according to [1], wherein the aluminates contain a compound of the composition formula $(Ba_{1-a}Eu_a)_3Mg_2Al_{24}O_{41}$ wherein the formula satisfies $0.003 \leq a \leq 0.5$.

[6] A vacuum ultraviolet ray-exciting light-emitting element containing the phosphor for a vacuum ultraviolet ray-exciting light-emitting element according to [1].

DETAILED DESCRIPTION OF THE INVENTION

The present invention will be illustrated in detail below.

In general, an activator causes an effect as a phosphor by substituting with a part of constituent atoms without changing the structure of a substrate crystal. A phosphor for a vacuum ultraviolet ray-exciting light-emitting element of the present invention is a phosphor having as a substrate a compound particularly having a magnetoplumbite crystal structure among aluminates, and containing Eu as an activator.

As aluminates which are substrates having a magnetoplumbite structure, specifically, $MAl_{12}O_{19}$ (wherein, M represents one or more elements selected from the group consisting of Ca, Sr and Ba), $BaMg_2Al_{16}O_{27}$, $BaMgAl_6O_{11}$ and $Ba_3Mg_2Al_{24}O_{41}$ are preferable. A metal ion in these aluminates having a magnetoplumbite structure can be substituted with an activator, Eu (divalent) to give a phosphor for a vacuum ultraviolet ray-exciting light-emitting element containing the Eu.

Specifically, as compounds obtained by using as a substrate aluminates of the formula: $MAl_{12}O_{19}$ (wherein, M represents one or more elements selected from the group consisting of Ca, Sr and Ba) and substituting M in the formula with an activator, Eu (divalent), there are listed phosphors for a vacuum ultraviolet ray-exciting light-emitting element of the formula: $M_{1-a}Eu_aAl_{12}O_{19}$ (wherein, M represents one or more elements selected from the group consisting of Ca, Sr and Ba, and $0.003 \leq a \leq 0.5$.).

Further, as compounds obtained by using as a substrate aluminates of the formula: $BaMg_2Al_{16}O_{27}$ and substituting Ba in the formula with an activator, Eu (divalent), there are listed phosphors for a vacuum ultraviolet ray-exciting light-emitting element of the formula: $Ba_{1-a}Eu_aMg_2Al_{16}O_{27}$ ($0.003 \leq a \leq 0.5$).

Furthermore, as compounds obtained by using as a substrate aluminates of the formula: $BaMgAl_6O_{11}$ and substituting Ba in the formula with an activator, Eu (divalent), there are listed phosphors for a vacuum ultraviolet ray-exciting light-emitting element of the formula: $Ba_{1-a}Eu_aMgAl_6O_{11}$ ($0.003 \leq a \leq 0.5$).

Still more, as compounds obtained by using as a substrate aluminates of the formula: $Ba_3Mg_2Al_{24}O_{41}$ and substituting Ba in the formula with an activator, Eu (divalent), there are listed phosphors for a vacuum ultraviolet ray-exciting light-emitting element of the formula: $(Ba_{1-a}Eu_a)_3Mg_2Al_{24}O_{41}$ ($0.003 \leq a \leq 0.5$).

A phosphor for a vacuum ultraviolet ray-exciting light-emitting element of the present invention can also be applied to phosphors excited by ultraviolet rays out of the vacuum ultraviolet range, X ray and electron beam, and to elements using the same.

A method of producing a phosphor of the present invention is not particularly restricted, and can be produced by known methods such as, for example, a method disclosed in JP-A No. 10-53760. In general, it can be produced by compounding raw materials so as to provide a given composition and calcining the composition.

A phosphor of the present invention can be obtained by a method in which raw materials are weighed so as to provide a given composition, mixed using a ball mill, V-shape mixer or stirring apparatus and the like, then, calcined for 1 hour to 50 hours at temperatures from 900 to 1600° C.

For example, as the aluminum source raw material, alumina having high purity (purity: 99.9% or more)(crystal form may be α-alumina or intermediate alumina), aluminum hydroxide, aluminum nitrate or aluminum halides having high purity (purity: 99% or more) and the like can be used.

As the barium source raw material, compounds which can be decomposed at high temperature to be barium oxide such as barium hydroxide, barium carbonate, barium nitrate, barium halides or barium oxalate having high purity (purity: 99% or more) and the like, or barium oxide having high purity (purity: 99% or more) can be used.

As the calcium source raw material, compounds which can be decomposed at high temperature to be calcium oxide such as calcium hydroxide, calcium carbonate, calcium nitrate, calcium halides or calcium oxalate having high purity (purity: 99% or more) and the like, or calcium oxide having high purity (purity: 99% or more) can be used.

As the strontium source raw material, compounds which can be decomposed at high temperature to be strontium oxide such as strontium hydroxide, strontium carbonate, strontium nitrate, strontium halides or strontium oxalate having high purity (purity: 99% or more) and the like, or strontium oxide having high purity (purity: 99% or more) can be used.

As the magnesium source raw material, compounds which can be decomposed at high temperature to be magnesium oxide such as magnesium hydroxide, magnesium carbonate, magnesium nitrate, magnesium halides or magnesium oxalate having high purity (purity: 99% or more) and the like, or magnesium oxide having high purity (purity: 99% or more) can be used.

As the europium source raw material, compounds which can be decomposed at high temperature to be europium oxide such as europium hydroxide, europium carbonate, europium nitrate, europium halides or europium oxalate having high purity (purity: 99% or more) and the like, or europium oxide having high purity (purity: 99% or more) can be used.

When compounds which can be decomposed at high temperature to be an oxide such as a hydroxide, carbonate, nitrate, halide, oxalate and the like are used as a raw material, temporary calcinations can also be possible at temperatures from 600 to 800° C. before the main calcinations. As the calcination atmosphere in this procedure, a weak reductive atmosphere is preferable for obtaining a valency of Eu of 2. Further, calcinations can also be effected again in a weak reductive atmosphere after calcinations under the air atmosphere. Further, a flux can also be added for promoting the reaction. For enhancing the crystallinity of a phosphor, calcinations can also be effected again, if necessary.

A powder of a phosphor obtained by the above-mentioned methods can be disintegrated using a ball mill, jet mill and the like, and further, can be washed or classified, if necessary.

A phosphor containing aluminates having a magnetoplumbite structure of the present invention obtained by the above-mentioned methods is suitable for vacuum ultraviolet ray-exciting light-emitting elements such as PDP, rare gas lamp and the like, since the life property of brilliance thereof is excellent. Though a phosphor composed of aluminates having a β-alumina structure such as $BaMgAl_{10}O_{17}$:Eu and the like is used in current condition for a vacuum ultraviolet ray-exciting light-emitting element, a phosphor containing aluminates having a magnetoplumbite structure of the present invention reveals smaller reduction by time in brilliance in excitation by vacuum ultraviolet ray, the reason for this being unclear.

PDP using a phosphor for a vacuum ultraviolet ray-exciting light-emitting element of the present invention can be produced by known methods such as disclosed in, for example, JP A-No. 10-195428. Blue, green and red phosphors for a vacuum ultraviolet ray-exciting light-emitting element are mixed, for example, with a binder composed of an organic solvent and a polymer compound such as a cellulose-based compound, polyvinyl alcohol, to prepare a phosphor paste. This paste is applied, by a method such as screen printing and the like, on a barrier plate surface and the surface of a substrate in the form of stripe equipped with an address electrode, partitioned by the barrier plate in a rear surface substrate, and dried, to form phosphor layers, respectively. On them is laminated and adhered a surface glass substrate which is equipped with a transparent electrode and bass electrode crossing the phosphor layers and on the inner surface thereof a dielectric substance layer and protective layer are provided, and the inner atmosphere is exhausted and a rare gas of lower pressure such as Xe, Ne and the like is sealed, and discharge spaces are formed. PDP can be thus obtained.

According to the present invention, a phosphor suitable for vacuum ultraviolet ray-exciting light-emitting elements such as PDP, rare gas lamp and the like, and excellent in the life property of brilliance is obtained, and a vacuum ultraviolet ray-exciting light-emitting element having long life can be realized, giving industrial extreme usefulness.

EXAMPLE

The following example will illustrate the present invention further in detail, but it does not restrict the scope of the present invention.

Example 1

Alumina ($Al_2O_3$), calcium oxide (CaO) and europium oxide ($Eu_2O_3$) were weighed so as to give a molar ratio:

$Al_2O_3:CaO:Eu_2O_3$, and ground and mixed for 1 hour using an agate mortar. The resulted mixed powder was charged in an alumina boat, calcined 2 hours at 1250° C. in a mixed gas of argon and hydrogen (hydrogen content: 2 vol %), then, cooled gradually to room temperature. Measurement of the X ray diffraction of the resulted powder revealed that a single phase of a composition $Ca_{0.9}Eu_{0.1}Al_{12}O_{19}$ showing a magnetoplumbite structure was formed. The resulted powder was charged in a vacuum vessel, and irradiated with vacuum ultraviolet ray using an excimer 146 nm lamp (H0012 type, manufactured by Ushio Inc.), while maintaining a vacuum of 6.7 Pa ($5 \times 10^{-2}$ torr) or less, to give emission of violet color.

The resulted phosphor powder $Ca_{0.9}Eu_{0.1}Al_{12}O_{19}$ was placed in an atmosphere having a pressure of 13.2 Pa and containing a composition of 5 vol % Xe-95 volt Ne, and exposed to 100 W plasma for 1 hour. This phosphor powder was taken out and brilliance was measured to find that the reduction in brilliance as compared with that before plasma exposure was as small as 20%.

Comparative Example 1

A commercially available blue emitting phosphor $BaMgAl_{10}O_{17}$:Eu having a β-alumina structure was placed in an atmosphere having a pressure of 13.2 Pa and containing a composition of 5 vol % Xe-95 volt % Ne, and exposed to 100 W plasma for 1 hour. This phosphor powder was taken out and brilliance was measured to find that the reduction in brilliance as compared with that before plasma exposure was as large as 40%.

What is claimed is:

1. A phosphor for a vacuum ultraviolet ray-exciting light-emitting element comprising Eu as an activator, and aluminates having a magnetoplumbite structure, wherein the aluminates contain a compound of the composition formula $B_{1-a}Eu_aMgAl_6O_{11}$ wherein the formula satisfies $0.003 \leq a \leq 0.5$.

2. A vacuum ultraviolet ray-exciting light-emitting element containing the phosphor for a vacuum ultraviolet ray-exciting light-emitting element according to claim 1.

* * * * *

UNITED STATES PATENT AND TRADEMARK OFFICE
CERTIFICATE OF CORRECTION

PATENT NO. : 6,527,978 B2
APPLICATION NO. : 09/791605
DATED : March 4, 2003
INVENTOR(S) : Kyota Ueda et al.

It is certified that error appears in the above-identified patent and that said Letters Patent is hereby corrected as shown below:

In claim 1, at column 6, line 15, delete "$B_{1-a}Eu_aMgAI_6O_{11}$" and insert --$\underline{Ba_{1-a}Eu_aMgAI_6O_{11}}$--.

Signed and Sealed this

Fifth Day of December, 2006

JON W. DUDAS
*Director of the United States Patent and Trademark Office*